INVENTOR.
JAMES W. ANGUS
BY
OSTROLENK, FABER, GERB & SOFFEN
ATTORNEYS

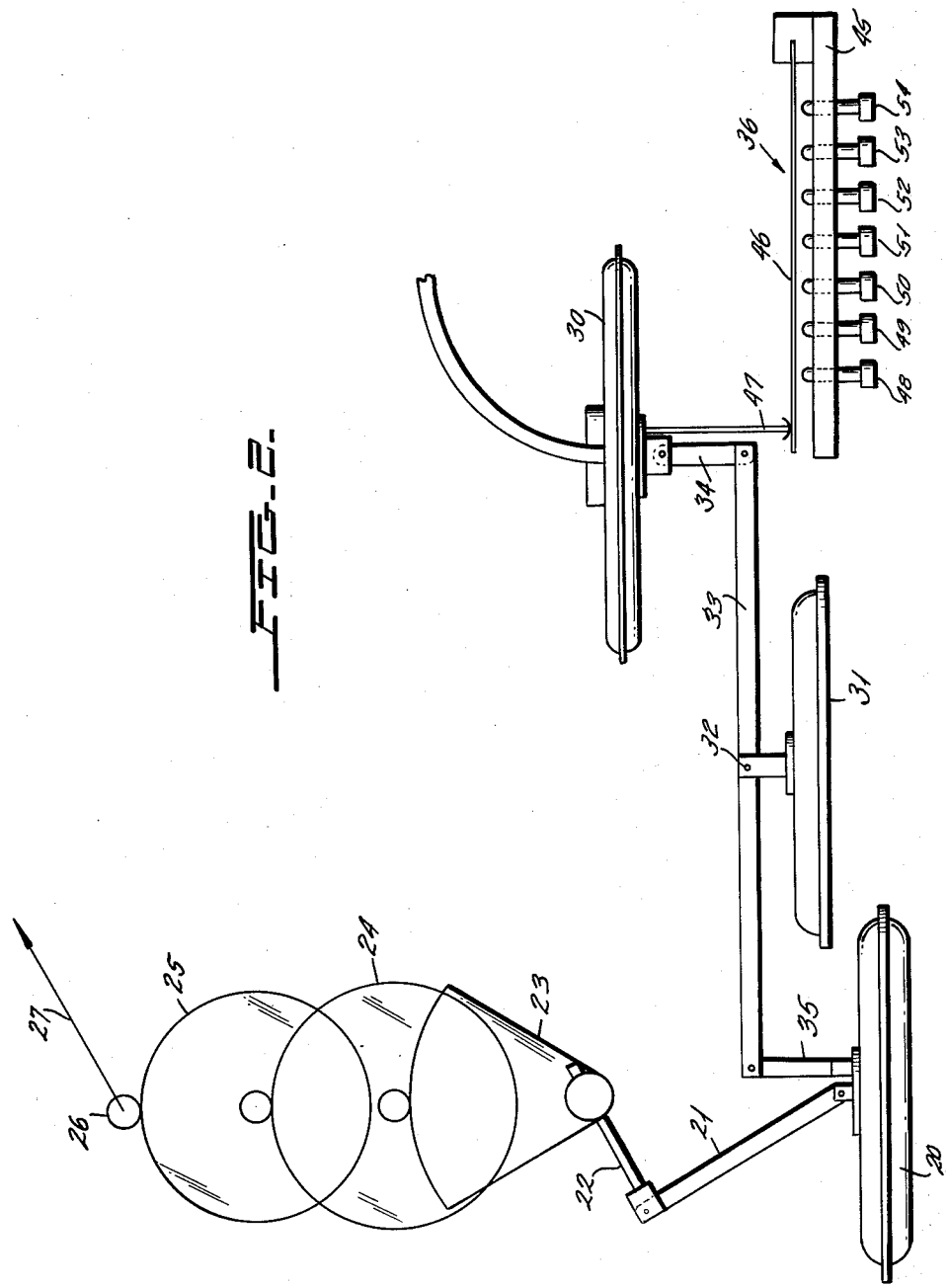

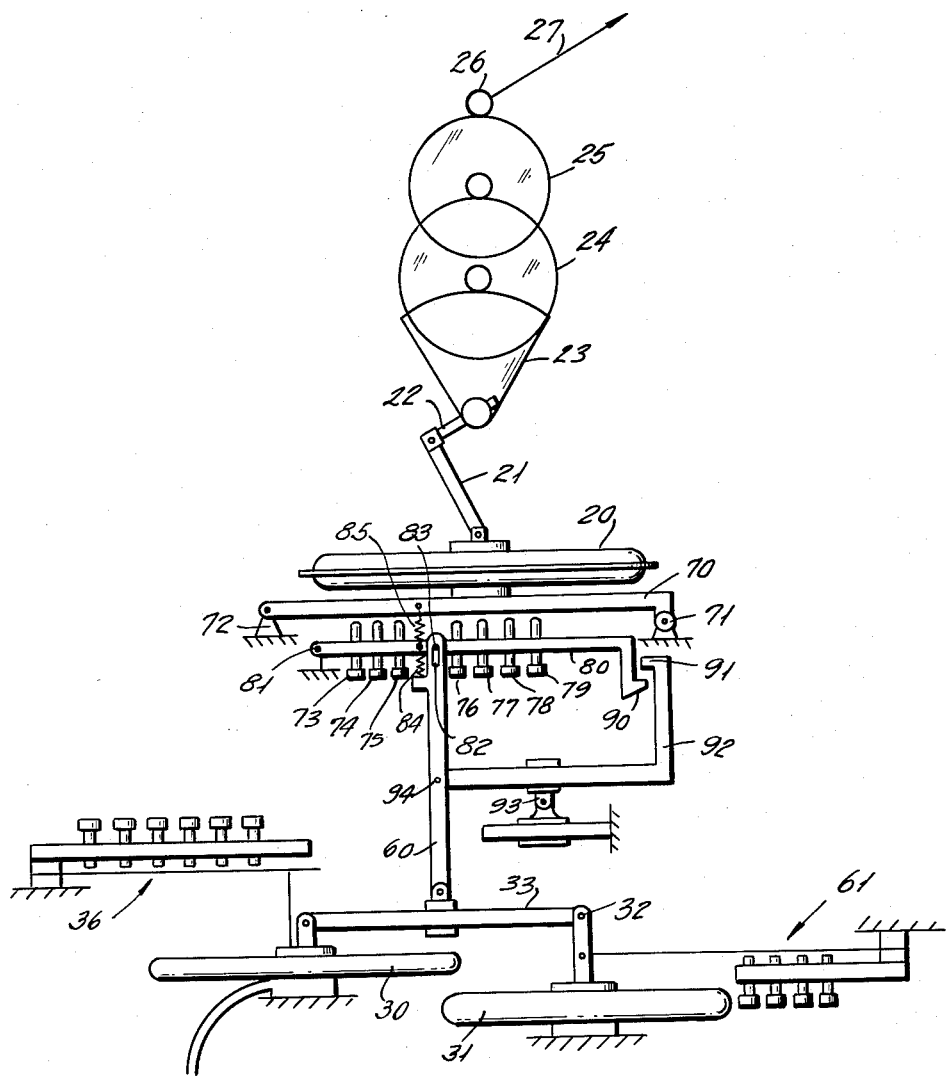

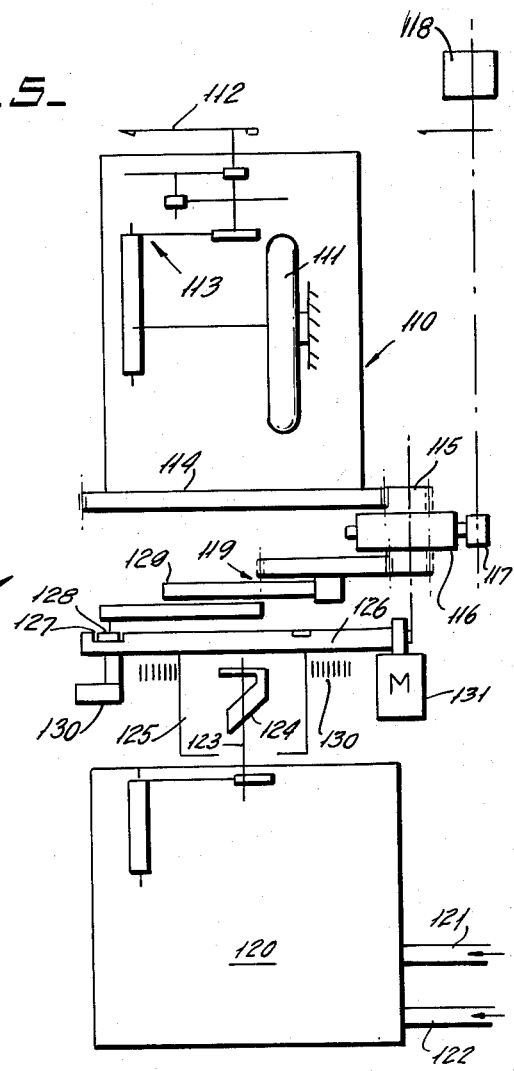
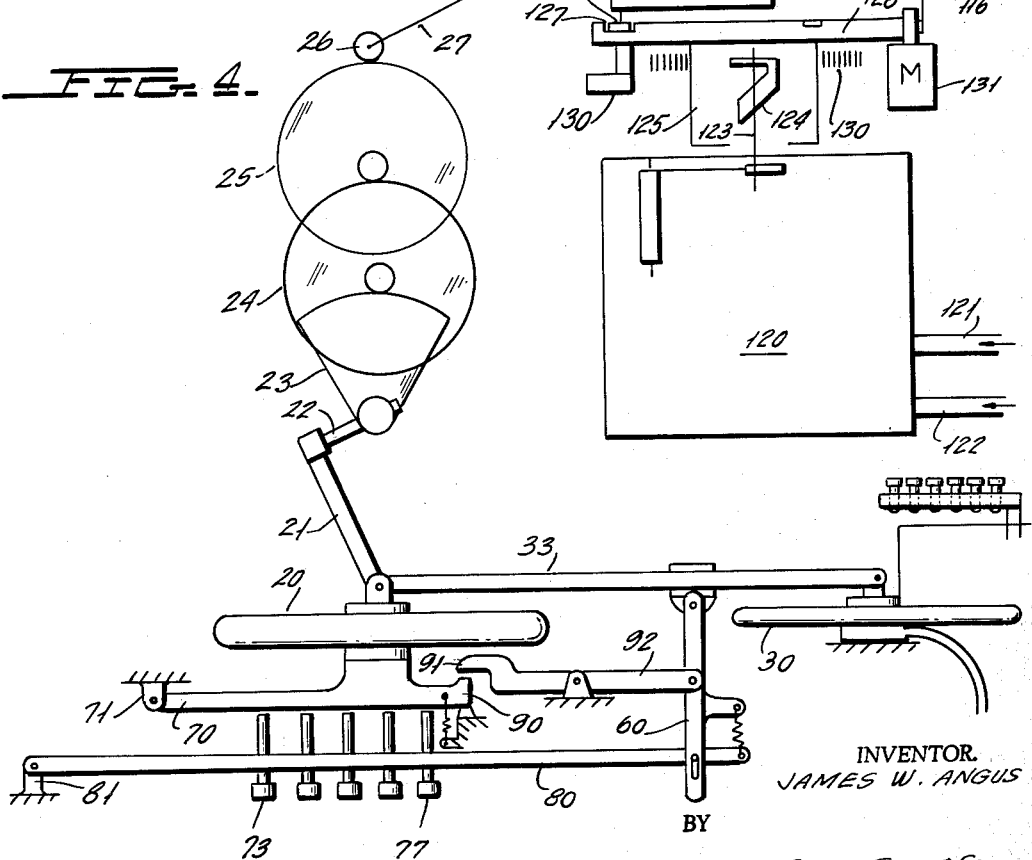

United States Patent Office
3,257,849
Patented June 28, 1966

3,257,849
ALL-MECHANICAL COMPENSATED ALTIMETER
James W. Angus, Chappaqua, N.Y., assignor to Kollsman Instrument Corporation, Elmhurst, N.Y., a corporation of New York
Filed May 3, 1963, Ser. No. 277,792
10 Claims. (Cl. 73—386)

This invention relates to a novel compensator structure for altimeters to compensate for errors due to static system defects in the altimeter reading, and more specifically relates to a novel static pressure error compensating system for altimeters which is mechanical in nature and can be applied to various types of aircraft.

The high density flying of present airways has accentuated the need for altitude information which has little or no error. In recent years much has been done to improve basic altimeter mechanisms such that the inherent instrument scale errors are well within practical manufacturing and operational requirements. Little has been done to compensate for the errors of the static pressure delivered to the altimeter.

Complex and costly computers can be made to compensate for this defect, but generally the reliability is low due to the number of elements necessary to complete the computation. The invention contemplates a single indicator which computes and displays sensed pressure-altitude compensated for the static system defect.

The static system defect is the error in altitude due to the difference in the pressure delivered to the static ports of the instruments and the free stream static pressure. The defect is caused by the characteristics of the airflow in the region of the static vents of the aircraft. Its magnitude is generally considered to be a function of the Mach number and to a lesser degree of the angle of attack of the aircraft. The principle of the invention is to measure these variables and to mechanically produce a correction as for instance by varying the position of a fulcrum in a mechanical linkage which is part of the mechanism of the pressure indicating instrument. Thus, the correction will automatically produce the correct instrument reading.

Moreover, where instruments for various type aircraft require different type of correction, as will be described, the mechanism components which influence the correction, can be altered as for instance by varying the linkage parameters or by replacing a cam with one of different slope thereby permitting the adaption of the instrument to an aircraft of the subsonic or supersonic type.

Accordingly, a primary object of this invention is to provide a simplified compensation system in the altimeter to correct for the static error of the aircraft.

Another object of this invention is to provide an inexpensive static pressure error compensation system.

A further object of this invention is to provide a novel all mechanical static pressure error compensation system for altimeters which can be simply modified for adaption to different types of aircraft.

These and other objects of this invention will become apparent from the following description when taken in connection with the drawings, in which:

FIGURE 2 is a first schematic diagram of an altimeter using the concepts of the present invention wherein the correction system can be applied to at least two of the aircraft static defects illustrated in FIGURE 1.

FIGURE 3 illustrates the manner in which the general concept presented in FIGURE 2 can be expanded for an instrument which can compensate for any of the errors of FIGURE 1.

FIGURE 4 shows a second embodiment of the device of FIGURE 3 wherein fewer mechanical linkages are required.

FIGURE 5 shows a still further embodiment of the invention wherein a replaceable cam can recalibrate the system for use with any of the aircraft whose characteristics are illustrated in FIGURE 1.

Figure 1:
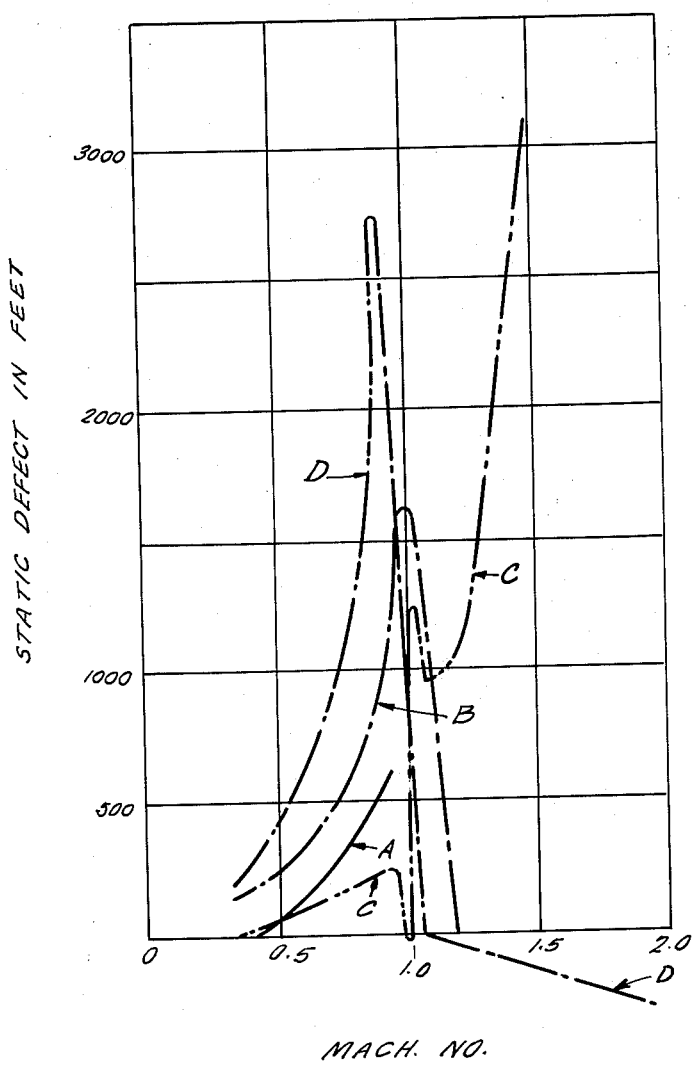
FIGURE 1 illustrates the manner in which a static defect varies for different types of aircraft as a function of Mach number.

Typical curves illustrating the static error defect are shown in FIGURE 1. Referring to FIGURE 1, the characteristics are as follows:

Curve A, which is representative of a subsonic aircraft, has a gradual increase in static system defect which becomes noticeable at approximately 0.5 Mach and reaches a peak of the order of 500 feet at its maximum operational Mach number.

Curve B, which is representative of a transonic type aircraft (one which exceeds Mach one by a small margin, say 1.1 to 1.2 Mach) has a much more severe error which can be three times as severe as the subsonic aircraft. This curve has the peculiar characteristic of a "saw tooth" type error. That is, the static error returns to approximately zero very sharply once the shock wave has passed the static port.

Curve C, which is representative of one type of supersonic aircraft, functionally increases less steeply than either A or B in the subsonic region and continues on to very high values in the supersonic region. A peculiar double reversal takes place in the transonic region.

Curve D, which is representative of a different type of supersonic aircraft, has a characteristic somewhat similar to the transonic aircraft (curve B) except that the magnitude of the error is roughly twice that of the transonic aircraft static system error.

These curves, which are well known, illustrate the problems of mechanization of an instrument for use in the various aircraft.

Basic pressure altimeters whose scale accuracy fall into the ½% bracket below 50,000 feet are now in use. This type has errors of 30 feet at sea level to 280 feet at 50,000 feet. Noting the order of magnitude of the errors in FIGURE 1, it can be understood that static system defect correction is mandatory.

A first embodiment of the invention is illustrated in FIGURE 2, and presents a novel simple, mechanical compensation structure which will compensate for the static errors illustrated in FIGURE 1 by curves A and C.

In FIGURE 2, the basic altimeter device is schematically shown as the sensing aneroid 20 which has an output link 21 which is pivotally connected to link 22 that drives the schematically illustrated sector gear 23. The sector gear drives the gear train which includes gears 24, 25 and 26 where gear 26 is connected to the indicating pointer 27.

If desired, the indicating altimeter, schematically illustrated in FIGURE 2, could be of the type shown in my Patent No. 3,009,357, issued November 21, 1961 and assigned to the assignee of the present invention.

As indicated in FIGURE 1 for the case of curves A and C, which correspond to subsonic aircraft and one type of supersonic aircraft, the static defect curves are similar where they increase with a similar shape as a function of Mach number. In accordance with the present invention, a mechanical correction is introduced into the sensing aneroid 20 which compensates for Mach number responsive error of curves A and C of FIGURE 1 in a purely mechanical manner. More specifically, a differential diaphragm 30 is provided which measures the difference between the free-stream stagnation pressure measured at the head of the Pitot tube and the free stream static pressure measured at the static port of the Pitot tube or the flush static port of the fuselage, corresponding to the aircraft's altitude.

The Mach number is known to be functionally related to the ratio of impact pressure divided by the free-stream static pressure.

The output movement of differential pressure diaphragm 30 is a function of Mach number. Since the Mach number varies with altitude and impact pressure, a compensating aneroid 31 is provided which will alter the correction due to differential diaphragm 30 for the altitude of the aircraft, whereby the total correction applied to sensing aneroid 20 will, depending upon the type of aircraft, provide an appropriate static defect correction to either curve A or curve C.

It is to be noted that the correction of differential press diaphragm 30 is affected by compensating aneroid 31 which moves the fulcrum 32 of link 33 which connects the output link 34 of differential diaphragm 30 to the link of the sensing aneroid 20.

The differential diaphragm 30, which is actually an airspeed-type diaphragm, should be of the log $q_c$ type, where $q_c$ is the difference between the free-stream total pressure and the free-stream static pressure. Since a true log $q_c$ motion is impossible to achieve by the differential diaphragm alone, a restraining system is preferably included, and is illustrated as restraining system 36.

The restraining system 36 is generally comprised of a support 45 which has a flexible member 46 extending therefrom, and which is biased into engagement with extending link 47 of differential diaphragm 30. The biasing force of member 46 can be altered by the adjusting screws such as adjusting screws 48 through 54 which are threadably received in support 45, and can be screwed into engagement with flexible member 46. This will change the effective length of flexible member 46, and thus a restraining characteristic imposed on diaphragm 30.

Where $q_c$ equals 0 and no correction is required, the static pressure aneroid 31 with fulcrum 32 will follow the motion of indicating aneroid 20. Since the aneroids 20 and 31 are very close to log $p$, the addition of log $q_c$ to log $p$ will produce a compensated reading which is very close to the theoretical value.

The calibration of the system is accomplished through the appropriate adjustment of restraining system 36 and the initial position of fulcrum 32. Thus, depending upon the type of aircraft the instrument is to be used with, the instrument can be adjusted to compensate in accordance with typical error curves A or C shown in FIG. 1 which the correction must follow.

The all-mechanical corrected system of FIGURE 2 can be expanded, as illustrated in FIGURE 3, so that a single instrument can be used to correct any of the characteristics of the type shown in curves A, B, C and D in FIGURE 1.

Referring to FIGURE 3 where components similar to those of FIGURE 2 have been given similar identifying numerals, it will first be observed that the fulcrum 32 of link 33 has been shifted to the end of the link with the take-off motion being applied to link 60. Moreover, a restraining system 61 has been added to the log $p_s$ aneroid 31 as well as to the log $q_c$ diaphragm 30.

The restraining systems 36 and 61 for diaphragms 30 and 31 appropriately trim their respective diaphragms so that they will be in agreement to result in a motion which is a function of Mach number for a particular instrument.

The main sensing aneroid 20 is mounted on a platform 70 which is mounted on pivot 71. The left-hand end of platform 70 normally falls against a correction zero stop 72. The platform 70 is then engageable by the extending ends of screws 73 through 79 which are threadably connected in correction calibrator arm 80 which is pivotally mounted on pivot point 81.

One or more of screws 73 through 79 can be appropriately adjusted to pick up the bottom of platform 70 during the motion of the system, as is required for a particular aircraft.

The pick-off arm 60 is then connected to the arm 80 by means of a slot 82 which engages a pin 83 carried on arm 80. Thus, a lost motion connection is provided between links 60 and 80. The arm 80 is normally biased to a position where pin 83 picks up the top of slot 82 by means of biasing spring 84 which sits between a shelf on link 60 and the bottom of arm 80. The platform 70 is normally biased to its lowest position by means of biasing spring 85 which is connected between arm 80 and platform 70.

The arm 80 has a lower extending hook 90 which is movable into a lip 91 of a correction reverser arm 92 which is pivotally mounted by fulcrum member 93, while the left-hand end of correction reverser 92 is pivotally mounted on link 60 by a pin 94.

The operation of the system of FIGURE 3 is as follows:

In the low Mach range (see FIGURE 1) the diaphragm support or platform 70 will rest against fixed stop 72 to thereby completely separate the correcting mechanism from the altitude mechanism during the critical take-off and landing regimes. In these regimes, of very low Mach number, the static pressure errors are very small and no correction is necessary.

As Mach number increases and a correction is introduced which includes the upward travel of link 60, the slot 82 will move upwardly and arm 80 will follow this upward motion by virtue of biasing spring 84. Once out of the high accuracy low Mach number region, and depending upon the type of aircraft, at least one of screws 73 through 79, depending upon the adjustment of the screw, will engage the bottom of platform 70 and move it upwardly to follow some preselected correction curve of the types shown in FIGURE 1.

Where the aircraft is of the type shown in curves B, C or D which have a reversal in the static defect for increasing Mach number, the instrument is so adjusted that once the appropriate Mach number is reached, the bottom of slot 82 will pick up pin 83 and thus cause arm 80 to follow the upward motion of link 60. This will occur until the bottom of hook 90 engages lip 91, whereupon a continued upward motion of link 60 will cause a drop in the calibrator arm 80 which is very sharp due to the rapid travel and geometry of the correction reverser 92.

As a second embodiment of the type structure shown in FIGURE 3 which will permit correction of any of the curves of FIGURE 1 in an all-mechanical system, FIGURE 4 illustrates a system which includes fewer parts than that of FIGURE 3. In FIGURE 4, components similar to those of FIGURE 3 have been given similar identifying numerals.

In the design of FIGURE 4 the main capsule 29 replaces the capsule 31 of FIGURE 3 and the resultant motion is used to lift the basic capsule 20 in its deflection as a function of altitude.

A still further embodiment of the invention is set forth in FIGURE 5 which is particularly applicable to altimeters of the type shown in my above noted Patent No. 3,009,358. Thus, in FIGURE 5, the altimeter 110 is generally comprised of a sensing aneroid 111 which is connected to an indicating pointer 112 through an appropriate gear train 113 which is schematically illustrated. The entire altimeter housing 110 can be rotated with respect to a relatively stationary indicating dial, as indicated in the above noted copending application to correct the pointer reading. Thus, for example, the housing 110 is provided with a gear 114 which receives the output gear 115 of a differential 116. The differential 116 has a barometric adjusting member 117 which is operated by a manually adjustable barometric knob 118, and has an input as through the gear train 119 which would be independent of the initial barometric adjustment by means of knob 118 wherein the net adjustment will adjust the rotational position of altimeter 110 by rotation of its support gear 114.

In order to provide the correction for pointer 112, an appropriate computing mechanism 120, which could be housed at the rear of the instrument case, is provided with appropriate pressure inputs 121 and 122 to determine the ratio of differential pressure to static pressure which is, of course, a function of Mach number.

The mechanism 120 is such that it has a rotating output shaft 123 which is rotated as a function of Mach number, and is connected to the rotor schematically illustrated as rotor 124 of a servo device. The stator 125 of the servo device is then connected to a cam plate 126 which carries a cam surface 127 which is engaged by a cam follower 128 which is, in turn, linked to gear train 119 through appropriate connecting means 129.

A spring biasing mechanism 130 which can be secured to the instrument housing normally biases plate 126 and stator 125 toward some zero correction position and against stop 130 in the manner illustrated in U.S. Patent 3,009,357 to Andresen Jr. entitled Aircraft Instrument-Remote Control Fail-Safe and assigned to the assignee of the present invention, whereby in the event of a power failure, the complete instrument will revert to a zero corrected position.

When a particular Mach number ouput is now generated by mechanism 120, stator 124 is rotated to cause an output signal which energizes motor 131 by an appropriate servo circuit whereby the plate 126 is rotated until the stator 125 is at a position to bring the error signal between stator 125 and rotor 124 to zero, whereby the plate 126 will be positioned in accordance with the Mach number output of mechanism 120.

The cam follower 128 will have then moved in accordance with the cam surface 127 which will move linkage 129 and, thus, drive gear train 119 in accordance with some predetermined curve of the type shown by curves A, B and C in FIGURE 1. That is to say, the cam surface 127 will be arranged in accordance with the type of aircraft that the instrument is to be used with, whereby the same instrument can be manufactured with mass production techniques with only the plate 126 being replaced in accordance with a particular aircraft type.

The synchro-motor loop can also be used to repeat a shaft value as a function of Mach number from a remote computer.

Although this invention has been described with respect to its preferred embodiments, it should be understood that many variations and modifications will now be obvious to those skilled in the art, and it is preferred, therefore, that the scope of this invention be limited not by the specific disclosure herein but only by the appended claims.

The embodiments of the invention in which an exclusive privilege or property is claimed are defined as follows:

1. A compensating mechanism for an altimeter; said altimeter comprising a pressure sensitive capsule mechanically coupled to an indicator means; said compensating mechanism being mechanically connected directly to one wall of said pressure sensitive capsule and being operable to vary the motion of said pressure sensitive capsule; said compensating mechanism including Mach number responsive means movable as a function of Mach number; said pressure sensitive capsule being subjected to forces as a function of Mach number to vary the output of said pressure sensitive means to said pointer.

2. A compensating mechanism for an altimeter; said altimeter comprising a pressure sensitive capsule mechanically coupled to an indicator means; said compensating mechanism being mechanically connected directly to one wall of said pressure sensitive capsule and being operable to vary the motion of said pressure sensitive capsule; said compensating mechanism including Mach number responsive means movable as a function of Mach number; said pressure sensitive capsule being subjected to forces as a function of Mach number to vary the output of said pressure sensitive means to said pointer; said Mach number responsive means including differential pressure diaphragm means; said differential pressure diaphragm means having an output link; said output link being connected to said pressure sensitive capsule.

3. A compensating mechanism for an altimeter; said altimeter comprising a pressure sensitive capsule mechanically coupled to an indicator means; said compensating mechanism being mechanically connected directly to one wall of said pressure sensitive capsule and being operable to vary the motion of said pressure sensitive capsule; said compensating mechanism including Mach number responsive means movable as a function of Mach number; said pressure sensitive capsule being subjected to forces as a function of Mach number to vary the output of said pressure sensitive means to said pointer; said Mach number responsive means including differential pressure diaphragm means; said differential pressure diaphragm means having an output link; said output link being connected to said pressure sensitive capsule; said output link being pivotally movable about a central point thereof.

4. A compensating mechanism for an altimeter; said altimeter comprising a pressure sensitive capsule mechanically coupled to an indicator means; said compensating mechanism being mechanically connected directly to one wall of said pressure sensitive capsule and being operable to vary the motion of said pressure sensitive capsule; said compensating mechanism including Mach number responsive means movable as a function of Mach number; said pressure sensitive capsule being subjected to forces as a function of Mach number to vary the output of said pressure sensitive means to said pointer; said Mach number responsive means including differential pressure diaphragm means; said differential pressure diaphragm means having an output link; said output link being connected to said pressure sensitive capsule; said output link being pivotally movable about a central point thereof; said central point of said link being carried by auxiliary pressure sensitive capsule means.

5. A compensating mechanism for an altimeter; said altimeter comprising a pressure sensitive capsule mechanically coupled to an indicator means; said compensating mechanism being mechanically connected directly to one wall of said pressure sensitive capsule and being operable to vary the motion of said pressure sensitive capsule; said compensating mechanism including Mach number responsive means movable as a function of Mach number; said pressure sensitive capsule being subject to forces as a function of Mach number to vary the output of said pressure sensitive means to said pointer; said compensating mechanism including cam means movable to predetermined correcting positions for said pressure sensitive capsule and connected between said pressure sensitive capsule and said Mach number responsive means.

6. A compensating mechanism for an altimeter; said altimeter comprising a pressure sensitive capsule mechanically coupled to an indicator means; said compensating mechanism being mechanically connected directly to one wall of said pressure sensitive capsule and being operable to vary the motion of said pressure sensitive capsule; said compensating mechanism including Mach number responsive means movable as a function of Mach number; said pressure sensitive capsule being subjected to forces as a function of Mach number to vary the output of said pressure sensitive means to said pointer; said compensating mechanism including cam means movable to predetermined correcting positions for said pressure sensitive capsule and connected between said pressure sensitive capsule and said Mach number responsive means; said cam means being removable and replaceable.

7. A compensating mechanism for an altimeter; said altimeter comprising a pressure sensitive capsule mechanically coupled to an indicator means; said compensating mechanism being mechanicallly connected directly to one wall of said pressure sensitive capsule and being operable to vary the motion of said pressure sensitive capsule; said compensating mechanism including Mach number responsive means movable as a function of Mach number; said pressure sensitive capsule being subject to forces as a function of Mach number to vary the output of said pressure sensitive means to said pointer; said compensating mechanism including cam means movable to predetermined correcting positions for said pressure sensitive capsule and connected between said pressure sensitive capsule and said Mach number responsive means; said cam means being removable and replaceable; said cam means having a contour determined by the type aircraft to receive said altimeter.

8. A compensating mechanism for an altimeter; said altimeter comprising a pressure sensitive capsule mechanically coupled to an indicator means; said compensating mechanism being mechanically connected directly to one wall of said pressure sensitive capsule and being operable to vary the motion of said pressure sensitive capsule; said compensating mechanism including Mach number responsive means movable as a function of Mach number; said pressure sensitive capsule being subjected to forces as a function of Mach number to vary the output of said pressure sensitive means to said pointer; said compensating mechanism including correction motion reversing means for reversing the direction of correction for said pressure capsule at a predetermined Mach number.

9. A compensating mechanism for an altimeter; said altimeter comprising a pressure sensitive capsule mechanically coupled to an indicator means; said compensating mechanism being mechanically connected directly to one wall of said pressure sensitive capsule and being operable to vary the motion of said pressure sensitive capsule; said compensating mechanism including Mach number responsive means movable as a function of Mach number; said pressure sensitive capsule being subjected to forces as a function of Mach number to vary the output of said pressure sensitive means to said pointer; said Mach number responsive means including differential pressure diaphragm means; said differential pressure diaphragm means having an output link; said output link being connected to said pressure sensitive capsule; said compensating mechanism including correction motion reversing means for reversing the direction of correction for said pressure capsule at a predetermined Mach number.

10. A compensating mechanism for an altimeter; said altimeter comprising a pressure sensitive capsule mechanically coupled to an indicator means; said compensating mechanism being mechanically connected directly to one wall of said pressure sensitive capsule and being operable to vary the motion of said pressure sensitive capsule; said compensating mechanism including Mach number responsive means movable as a function of Mach number; said pressure sensitive capsule being subjected to forces as a function of Mach number to vary the output of said pressure sensitive means to said pointer; said Mach number responsive means including differential pressure diaphragm means; said differential pressure diaphragm means having an output link; said output link being connected to said pressure sensitive capsule; said compensating mechanism including correction motion reversing means for reversing the direction of correction for said pressure capsule at a predetermined Mach number; said reversing means being connected to said output link.

References Cited by the Examiner
UNITED STATES PATENTS 3,154,944  11/1964  Johanson _____ 73—182

LOUIS R. PRINCE, *Primary Examiner.*

D. O. WOODIEL, *Assistant Examiner.*